(12) United States Patent
Brauch

(10) Patent No.: US 6,173,248 B1
(45) Date of Patent: Jan. 9, 2001

(54) METHOD AND APPARATUS FOR HANDLING MASKED EXCEPTIONS IN AN INSTRUCTION INTERPRETER

(75) Inventor: Rupert Julian Alexander Brauch, Palo Alto, CA (US)

(73) Assignee: Hewlett-Packard Company, Fort Collins, CO (US)

( * ) Notice: Under 35 U.S.C. 154(b), the term of this patent shall be extended for 0 days.

(21) Appl. No.: 09/020,653

(22) Filed: Feb. 9, 1998

(51) Int. Cl.[7] .................................... G06F 3/00
(52) U.S. Cl. .............................. 703/26; 703/27; 712/244
(58) Field of Search ..................... 395/500.47, 500.48, 395/680; 710/260, 266; 712/244; 703/26, 27

(56) References Cited

U.S. PATENT DOCUMENTS

| | | | | |
|---|---|---|---|---|
| 5,237,700 | * | 8/1993 | Johnson et al. | 395/775 |
| 5,606,696 | * | 2/1997 | Ackerman et al. | 395/678 |
| 5,632,028 | * | 5/1997 | Thusoo et al. | 395/500 |
| 5,685,009 | * | 11/1997 | Blomgren et al. | 395/800 |
| 5,729,710 | * | 3/1998 | Magee et al. | 395/413 |
| 5,778,211 | * | 7/1998 | Hohensee et al. | 395/500 |
| 5,826,084 | * | 10/1998 | Brooks et al. | 395/677 |
| 5,854,913 | * | 12/1998 | Goetz et al. | 395/386 |
| 5,889,978 | * | 3/1999 | Jayakumar | 395/500 |
| 5,953,516 | * | 9/1999 | Bonola | 395/500 |

* cited by examiner

*Primary Examiner*—Kevin J. Teska
*Assistant Examiner*—Thai Phan

(57) ABSTRACT

A method and apparatus for handling masked exceptions that receives an exception from the operating system on which an emulator is running a user program and determines the origin of the exception. If the emulator generated the exception, the emulator handles the exception internally and returns it to the operating system. If the emulated user program generated the exception, the emulator checks the status of the exception type. If that type of exception is blocked, the exception is marked as deferred. Otherwise, the exception is delivered to the user application or marked as pending for later delivery. The system and method can maintain a virtual exception mask to indicate the status of the exception type.

19 Claims, 3 Drawing Sheets

METHOD AND APPARATUS FOR HANDLING MASKED EXCEPTIONS IN AN INSTRUCTION INTERPRETER

FIELD OF THE INVENTION

The present invention lies in the field of software emulation and, more specifically, is directed to faithfully handling exceptions in the context of emulating a user program.

BACKGROUND OF THE INVENTION

Software emulation systems use a combination of instruction interpretation and instruction translation to run a program originally written for an old machine architecture on a new architecture. This technology can also be used to emulate a program for one architecture on the same architecture for the purposes of profiling that program.

An instruction emulator maintains an emulated state that models the state of the legacy architecture. During emulation, the emulator modifies the emulated state in the same way that the machine state would have been modified had the program executed on the legacy architecture. "Instruction interpretation" refers to the process of modeling the effects of each instruction on that emulated state. "Instruction translation" refers to a more sophisticated process in which one or more blocks of code from the legacy program are translated into functionally equivalent blocks of code executable on the new platform. Since dynamic translation eliminates the overhead of the interpreter, it is usually an order of magnitude faster than instruction interpretation. In addition, the translator may optimize the translated code so that it runs faster than the raw translated code. Some of these optimizations reorder the instructions in the translated code. However, this reordering must not change the behavior of the emulated program. The significance of this fact to exception delivery will be explained subsequently.

Emulation also is used for program profiling. "Instruction interpretation" examines the effects of each instruction in the legacy program—one instruction at a time—and forms a corresponding instruction executable on the new platform. "Instruction translation" refers to a more sophisticated process in which multiple instructions, i.e. blocks of code, are translated into a functionally equivalent new block of code executable on the new platform. The new block of code hopefully executes more efficiently than would result from simple instruction interpretation. For example, the translated code might take advantage of instructions that were not available on the old platform. However, frequently a combination of both instruction interpretation and instruction translation is employed to emulate a given user program successfully.

In addition to emulating the semantics of the old instruction set, the emulator must deliver exceptions to the emulated process in a manner consistent with the old system. "Exceptions" can be briefly defined as unexpected or unusual conditions that arise during execution. An exception generally arises in the hardware and is communicated to the operating system ("OS"). The OS in some cases "delivers" the exception to the user application as further explained below. Exceptions can be classified as either synchronous or asynchronous. Synchronous exceptions arise as a direct result of executing an instruction. Examples are arithmetic conditions like overflow or divide by 0, privilege or "permission" faults, etc. In general, the instruction has done something or attempts to do something illegal or exceeding available resources. Asynchronous exceptions are those caused by something external to the program. Examples are timer interrupts, communications with other programs (messages), etc. These can arise at any time and thus are "asynchronous" to the executing program.

Typically, when an operating system ("OS") generates an exception notice or "signal" to an application, the OS places a "sigcontext" on the application's stack. The sigcontext contains a snapshot of the machine state, plus information about interrupted system calls, if any. The machine state is restored according to the sigcontext when the signal handler returns. The signal handler may also modify the machine state contained in the sigcontext, and any such modifications will be propagated to the real machine state by the OS.

One challenge involved in exception emulation is that the emulator itself may receive exceptions as part of its normal operation. The emulator must determine whether it caused the exception and, if it did, handle it internally rather than deliver it to the emulated application. The emulator cannot allow any exceptions to be blocked, since if one of these exceptions were raised while it was blocked, the emulated application would "hang" when the operating system attempted to deliver the exception.

A related problem arises when the system translates the old code into instructions on the new architecture. In order to improve the performance of the translated code, the translator reorders instructions in the translated code. This introduces the possibility of the translator "speculating" a faulting instruction. In other words, the translator might cause an instruction to be executed that would not have been executed in the original program. If the emulator delivers one of these speculative exceptions to the emulated application, we have changed the exception behavior of the original program. The emulator needs to be able to recover from these exceptions, rather than deliver them to the application program. However, the emulator cannot recover if the signal is blocked, since the kernel will hang when trying to deliver the exception.

The need remains, therefore, for improvements in software emulation to address these exception-handling issues. More specifically, the need remains to accurately emulate the exception behavior that a user program would exhibit if it were it running on the legacy platform for which it was originally constructed.

SUMMARY OF THE INVENTION

One aspect of the present invention addresses the problems mentioned above by maintaining a "virtual exception mask" that indicates what the emulated application's exception mask (or "signal mask") would be if it were running on the "old" architecture. All system calls that would affect the actual (OS) exception mask are intercepted, and their effects are simulated on the virtual mask. A modified system call is made to change the actual mask, while filtering out selected exceptions so that they cannot be blocked.

The invention makes it possible for the emulator to receive an exception that the emulated application had blocked. In this case the virtual mask, but not the actual mask, will block the exception. When this occurs, the emulator marks the exception as "deferred" rather than pending. This means that the exception should be delivered to the emulated application as soon as the virtual mask no longer blocks the exception. The sets of pending and deferred exceptions are recomputed each time the virtual mask is changed. (Pending exception notices are not necessarily delivered immediately. Typically, an emulator periodically checks for pending notices, and delivers them at appropriately "safe" opportunities.)

Thus one aspect of the invention is a method for processing an exception while emulating execution of a user program constructed for execution on a legacy platform. The method includes the steps of: receiving an exception from the operating system; determining whether the received exception was caused by the emulator program or by the user program; and if the exception was caused by the emulator program, handling the exception internally in the emulator program without delivering the exception to the emulated user program. Further, if the exception was caused by the user program, the method calls for identifying the type of exception; determining whether the identified type of exception is currently blocked by the user program; and, if the identified type of exception is not currently blocked by the user program, delivering notification of the exception to the user program. In a presently preferred embodiment, determining whether the identified type of exception is blocked by the user program includes maintaining a virtual exception mask, as noted above, for simulating a user program exception mask as it would appear if the user program were running on the legacy platform.

The invention can be implemented in virtually any programming language; the C language being the presently preferred embodiment. The important limitation is that the emulator and operating system in combination provide for interception and initiation of exception signals and mask changes as further explained below.

Another aspect of the invention is directed to a method of maintaining a virtual exception mask in a digital computer for emulation, the computer having a memory, an operating system and an OS exception mask maintained by the operating system, and the method comprising the steps of: initializing a virtual exception mask as a data structure stored in the computer memory; during execution of an emulation in the computer, intercepting a user program system call; determining whether the system call would modify the OS exception mask; and if the system call would not modify the OS exception mask, delivering the system call to the operating system. On the other hand, if the system call would modify the OS exception mask, the method calls for instead updating the virtual exception mask in accordance with the intercepted system call.

A still further aspect of the invention is described as a digital computer having a memory and including: first, a legacy user program stored in the memory and comprising a predetermined series of user program instructions, the legacy user program having been constructed for execution on a predetermined legacy platform other than the said digital computer. Second, an emulator stored in the memory for executing the user program instructions by interpreting the user program instructions so as to form corresponding new instructions executable in the said digital computer. And third, a virtual exception mask stored in the memory and maintainable by the emulation program for handling synchronous exceptions encountered during execution of the said new instructions so as to simulate exception behavior of the legacy user program on the legacy platform.

The foregoing and other objects, features and advantages of the invention will become more readily apparent from the following detailed description of a preferred embodiment which proceeds with reference to the appended drawings.

DETAILED DESCRIPTION OF A PRESENTLY PREFERRED EMBODIMENT

Figure 1:
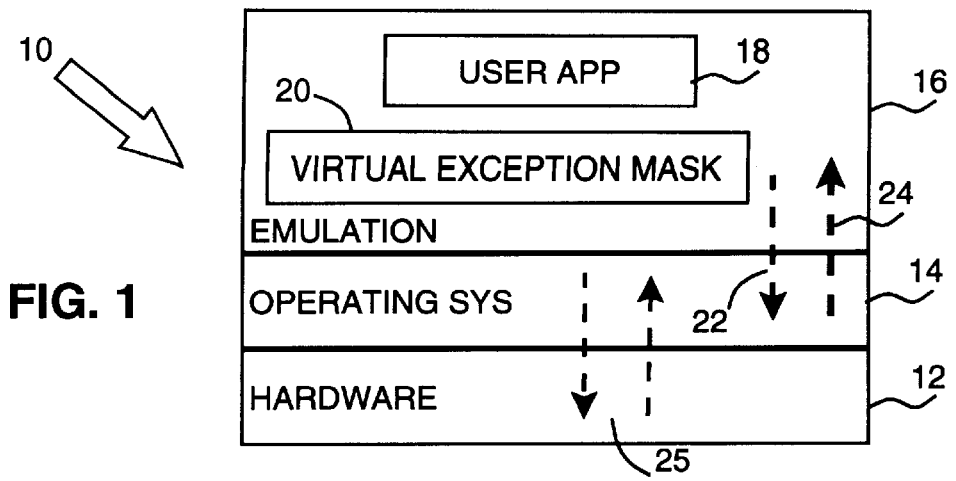
FIG. 1 is a simplified system block diagram of a digital computer system that implements a virtual exception mask according to the present invention.

FIG. 1 is a simplified block diagram of a digital computer system that implements methods and apparatus according to the present invention. In FIG. 1, the digital computer system 10 includes a hardware platform 12, which can comprise any digital computer architecture such as a CISC, RISC, (V)LIW or EPIC processor architecture. The purpose of the invention is primarily to support emulation on the hardware platform 12 of a user application program which was previously constructed to execute on a different hardware and/or operating system, which we call the legacy platform. As noted previously, it is useful in some cases for the new platform and the legacy platform to be the same platform.

In FIG. 1, an operating system 14 interfaces with the hardware platform 12 and provides the usual operating system functions for managing and utilizing hardware resources such as the processor, memory, and peripheral devices. An emulator 16 is stored in memory in the system 10 for execution in cooperation with the operating system 14 in the usual fashion. The emulator 16 provides for emulating execution of the user application program 18 and in connection therewith implements a virtual exception mask 20 further described shortly. The emulator, as discussed above, interprets the user program instructions and forms new instructions executable on the hardware platform 12. Dashed line 22 represents operating system calls (or simply "system calls") initiated by the emulation program 16, while dashed line 24 represents messages or signals initiated by the operating system, including notification of exceptions that arise during execution. Dashed lines 25 indicate hardware notification of exceptions to the operating system.

Figure 2:
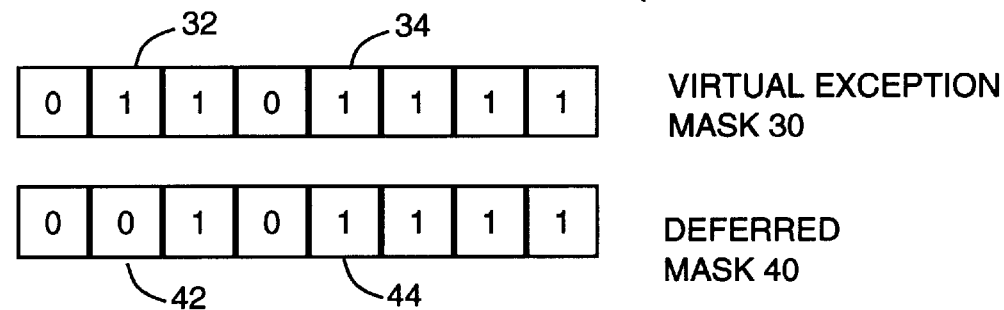
FIG. 2 illustrates one example of data structures for implementing a virtual exception mask and a deferred status mask according to another aspect of the invention.

FIG. 2 illustrates one example of data structures for implementing a virtual exception mask and a deferred mask according to the invention. For example, in the virtual exception mask 30 a data structure such as a digital word is provided in which each bit position corresponds to a predetermined type of exception. For example, a first bit position 32 may correspond to a privilege fault type of exception, while another bit position 34 may correspond to a floating point arithmetic exception. Other types of synchronous exceptions are known in the prior art, and any one or more of them may be represented in a data structure of the type illustrated.

In the virtual exception mask, a first binary state in each bit position, for example a logic 1, can be used to indicate that the corresponding type of exception is currently blocked by the user program and, conversely, the complementary logic state, i.e., logic 0, would indicate that the corresponding type of exception is not currently blocked. This virtual exception mask is distinguished from the conventional exception mask which is ordinarily maintained by the operating system (OS exception mask), whereas the virtual exception mask is maintained by the emulator, as further described below in the operation section.

A deferred mask 40 can be implemented as another data structure, also maintained by the emulator (16 in FIG. 1). Like the virtual exception mask 30, the deferred mask 40 includes a plurality of bit positions, each corresponding to a predetermined type of exception. This data structure is used to store an indication as to whether a given exception is pending or deferred. For example, a 0 logic state can be used to indicate that an exception is pending, while a 1 logic state can be used to indicate that it is deferred. In the example illustrated, the deferred mask bit positions are aligned with those of the virtual exception mask, so that each bit position corresponds to the same type of exception. Thus, continuing the prior example, the logic 0 in bit position 42 would indicate that the privilege exception is pending, while the logic 1 in bit position 44 would indicate that the floating point arithmetic exception is deferred—i.e. received but blocked in the virtual exception mask. However, it is not critical that the deferred mask be implemented in the same fashion as the virtual mask, as long as the functionality is provided as described herein.

It should also be noted that the data structures shown in FIG. 2 are merely illustrative. Other data structures can be used to implement the virtual exception mask, and/or the deferred mask, or they could be combined into a single data structure to speed interrogation of the masks. Alternatively, either or both of the masks could be implemented in hardware registers, details of which are known in the prior art for other purposes.

Figure 3:
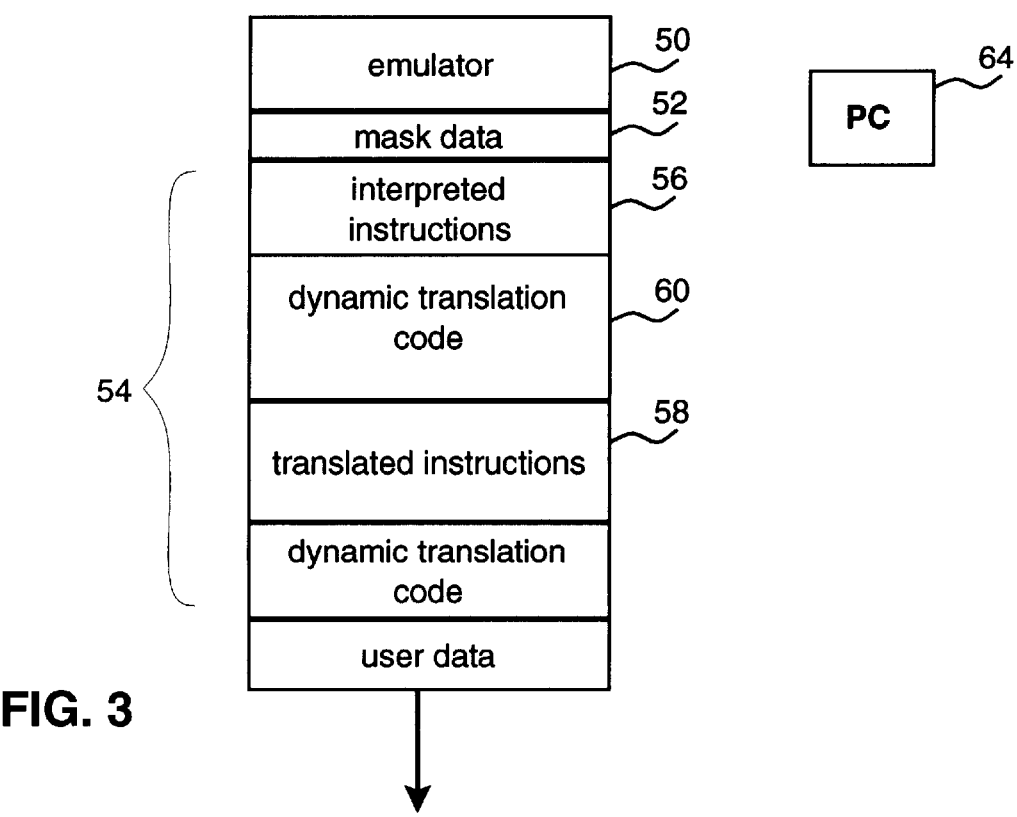
FIG. 3 is a portion of a memory map illustrating various instruction and data components stored in the memory of the digital computer system of FIG. 1.

FIG. 3 is a simplified memory map showing various instructions and data stored in a memory of the computer system 10 of FIG. 1. Typically, these components would be stored in the random access memory (RAM) accessible to the hardware 12. This memory map is merely illustrative, and the particular arrangement of the instructions and data, and the amounts of memory, etc., will depend upon the particular implementation, compiler, and hardware platform. Moreover, the memory map of FIG. 3 implies a von Neumann architecture, although the present invention could be implemented in the context of a Harvard architecture as well. The memory map shows emulator program code 50 followed by a data region 52. The virtual exception mask and deferred mask data structures can be stored in the data region 52.

The user application program is indicated by bracket 54. It comprises a series of instructions which can include interpreted instructions 56, translated instructions 58, etc. These are instructions executable on the new platform 12 to provide the same functionality as the original user program 18. One or more additional blocks of code, e.g., block 60 comprise dynamically translated code. A dynamic translator forms a new block of code which can include different instructions and a different sequence of operation vis-a-vis the original program. For example, a routine in a program originally constructed for execution on a RISC machine will look quite different when dynamically translated for execution in a VLIW platform. A program counter 64 keeps track of a current address in the memory space.

Operation

Figure 4:
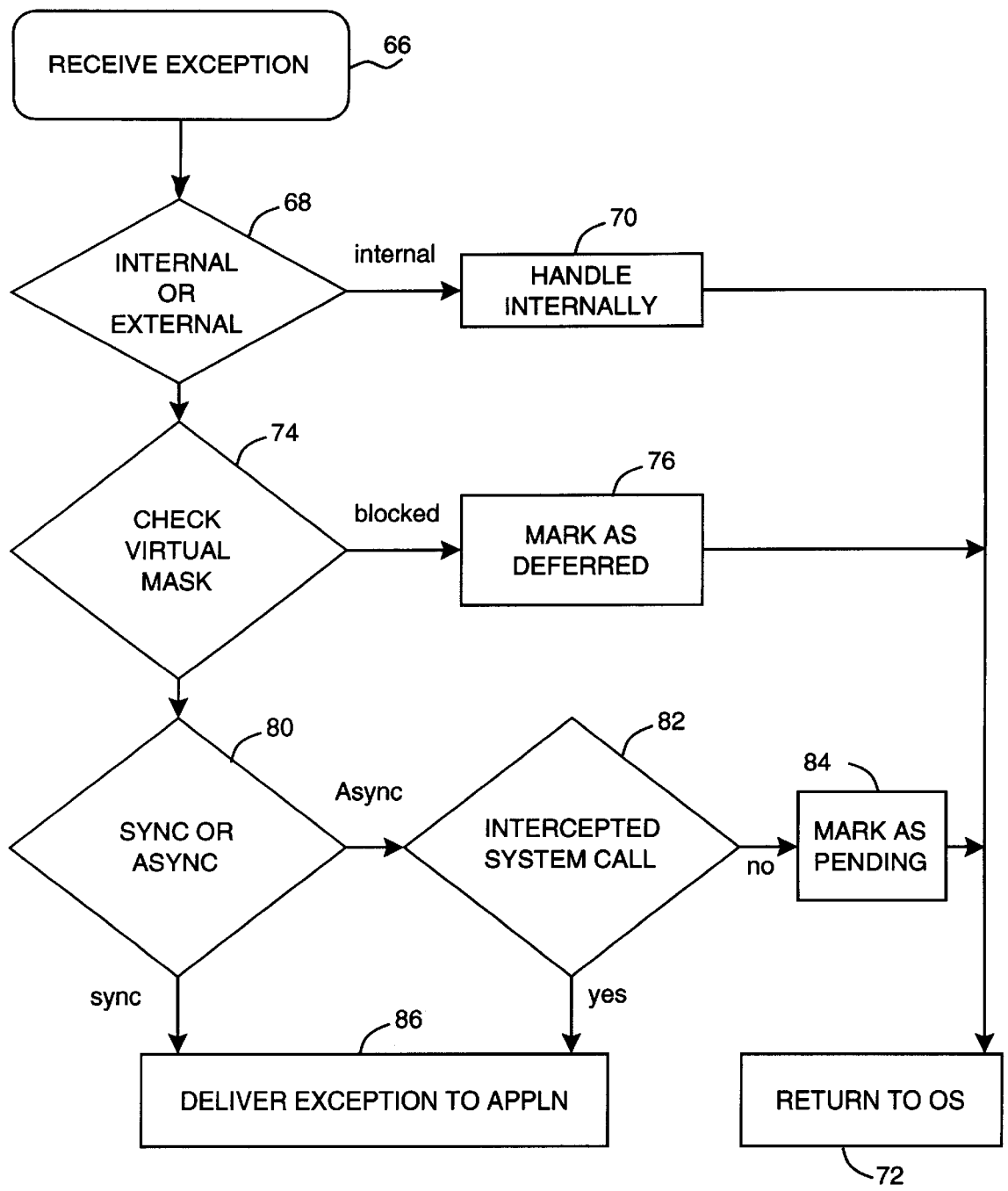
FIG. 4 is a simplified flow chart illustrating a method for processing an exception during emulation of a user program according to the invention.

FIG. 4 is a simplified flow chart illustrating a method for processing an exception according to the present invention. These steps are implemented by the emulator (16 in FIG. 1). First, in the step 66 the emulator receives an exception signal from the operating system (represented by dashed line 24 in FIG. 1). The emulator determines 68 whether the received exception was caused by the emulator program itself, i.e. internal, or by the user program, i.e. external. If the exception was caused by the emulator program, the exception is handled internally by the emulator, in step 70, and control returns to OS step 72. If the exception was caused by the user program (external), the emulator determines whether the identified type of exception is currently blocked by the user program. This determination can be made by checking the virtual exception mask in step 74. If the identified type of exception is currently blocked by the user program, the process withholds delivery of the exception, i.e., it intercepts the exception, and marks the exception as deferred, step 76. This step is conveniently carried out by implementing a deferred mask as described above. If the identified type of exception is not currently blocked by the user program, the emulator determines whether the exception is synchronous or asynchronous, step 80. If it is synchronous, the emulator delivers notification of the exception to the user program, step 86. If the exception is asynchronous, the emulator determines whether it is an intercepted system call, step 82. If so, the exception is delivered to the application, step 86. If not, the exception is marked as pending and control returns, step 72.

Figure 5:
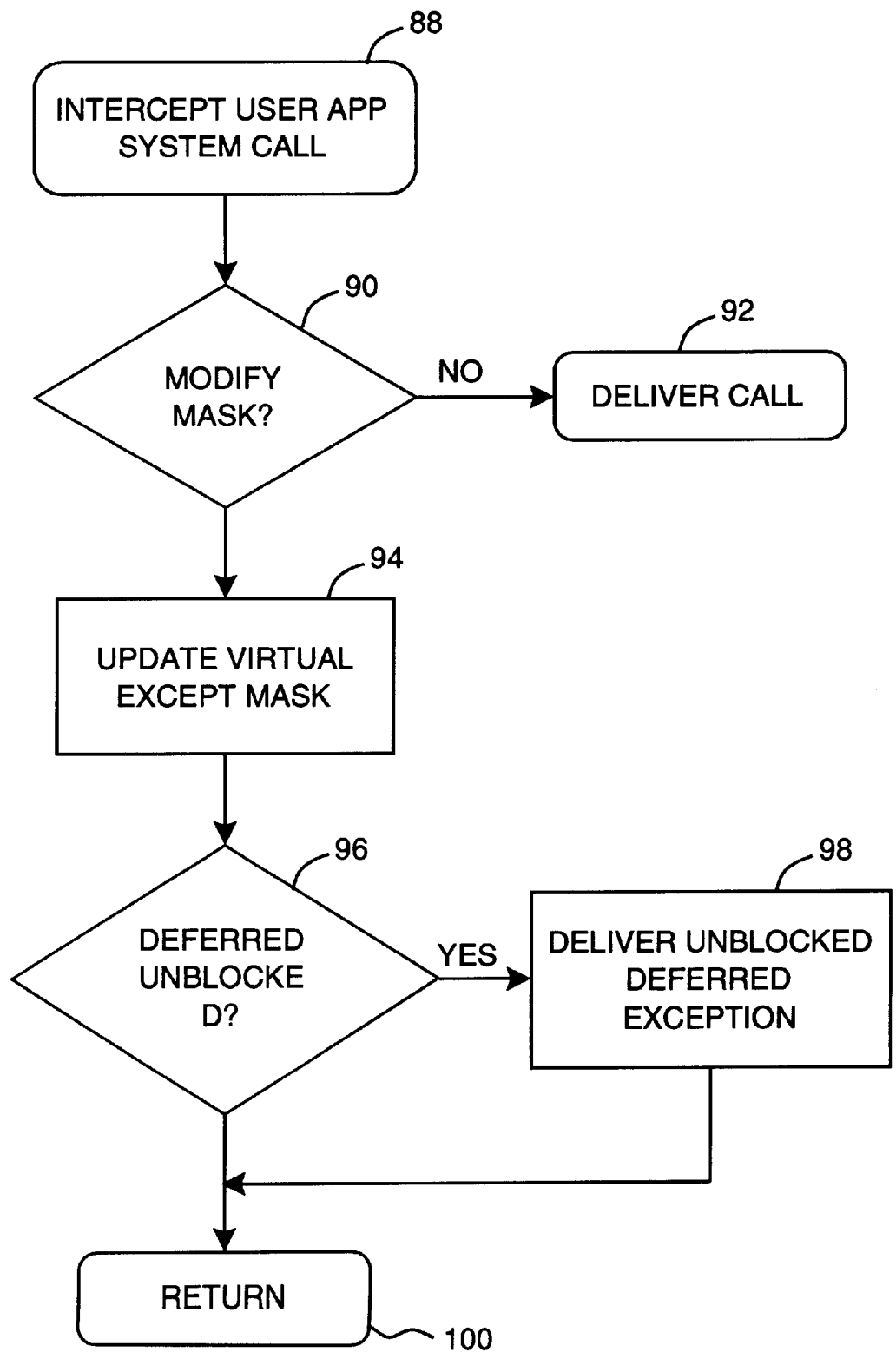
FIG. 5 is a simplified flow chart of a method of maintaining a virtual exception mask according to another aspect of the invention.

Referring next to FIG. 5, a process for maintaining the virtual exception mask is illustrated in the flow chart of FIG. 5. In step 88, the emulator detects a system call from the emulated application. The emulator next determines in step 90 whether the system call would modify the OS exception mask—the actual exception mask usually maintained by the operating system. If this determination 90 indicates that the system call would not modify the exception mask, the call is delivered to the operating system, step 92. On the other hand, if the emulated program makes a system call that would modify the signal mask, the emulator intercepts it, and processes it as follows. The emulator updates the virtual exception mask, in step 94, in accordance with the intercepted system call. In other words, the emulator marks selected types of exceptions as being block, or unblocked, in accordance with the system call.

Next, in step 96, the emulator determines whether any deferred exceptions are now unblocked according to the updated virtual exception mask, in step 96. If so, any newly-unblocked exceptions are delivered to the user program, in step 98. Finally, this system call interception routine concludes at the return step 100. As noted above, the steps of updating the virtual mask, and checking for deferred exceptions relative to the updated virtual mask can be carried out conveniently by implementing the data structures described above with reference to FIG. 2. To summarize, the present invention provides for maintaining a virtual exception mask that indicates what the emulated user program's actual exception mask would be if it were running on the old, legacy platform. System calls that would affect the exception mask are intercepted, and their effects simulated on the virtual mask. Then modified system calls are made to update the actual mask, while filtering out selected exceptions so that they cannot be blocked.

The invention makes it possible for the emulator to receive an exception that the emulated user program had blocked. In this event, the virtual mask, but not the actual mask, will block the exception. When this occurs, the emulator marks the exception as deferred rather than pending, so that the exception can be delivered to the emulated application as soon as the virtual mask no longer blocks the exception. The sets of pending and deferred exceptions are recomputed each time the virtual mask is changed, step 94 in FIG. 5.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A method for processing an exception in an emulator program running on a digital computer having a memory and under control of an operating system, the emulator program emulating execution of a user program constructed for execution on a legacy platform, the method comprising the steps of:

receiving an exception from the operating system;

determining whether the received exception was caused by the emulator program itself or by the user program;

if the exception was caused by the emulator program, handling the exception internally in the emulator program without delivering the exception to the emulated user program; and if the exception was caused by the user program:

identifying the type of exception;

determining whether the identified type of exception is currently blocked by the user program, wherein said determining whether the identified type of exception is blocked by the user program includes maintaining a virtual exception mask for simulating a user program exception mask as if the user program were running on the legacy platform;

if the identified type of exception is not currently blocked by the user program, delivering notification of the exception to the user program; and if the identified type of exception is currently blocked by the user program, withholding delivery of the exception from the user program, and marking the exception as deferred for subsequent processing.

2. A method for processing an exception according to claim 1, the digital computer further including an OS exception mask maintained by the operating system, and wherein said maintaining the virtual exception mask includes:

intercepting a user program system call;

determining whether the system call would modify the OS exception mask;

if the system call would not modify the OS exception mask, delivering the system call to the operating system; and if the system call would modify the OS exception mask, updating the virtual exception mask in accordance with the system call.

3. A method for processing an exception according to claim 2 and further comprising, responsive to said updating the virtual exception mask, determining whether any deferred exceptions are now unblocked according to the updated virtual exception mask;

delivering any unblocked exceptions to the user program; and then, for each such delivered unblocked exception, clearing the indication that the delivered exception had been deferred.

4. A method for processing an exception according to claim 1 wherein said maintaining the virtual exception mask includes storing the virtual exception mask as a predetermined data structure within the emulator memory space.

5. A method for processing an exception according to claim 1 further comprising creating and maintaining a status mask for indicating a status as deferred or not deferred for each one of at least one predetermined type of exception; and wherein said marking the exception as deferred includes updating the status mask to indicate a status of the exception as deferred.

6. A method according to claim 5 wherein the status mask is implemented as a predetermined data structure within the emulator memory space.

7. A method for processing an exception according to claim 1 and further comprising, if the exception is determined to have been caused by the user program, and if the exception is not currently blocked by the user program, determining whether the exception is synchronous or asynchronous; and if the exception is synchronous, delivering the exception to the user program.

8. A method for processing an exception according to claim 7 and further comprising, if the exception is asynchronous, determining whether the exception indicates an interrupted system call; and if not, marking the exception as pending.

9. A method for processing an exception according to claim 8 and further comprising, if the exception is asynchronous, and if the exception indicates an interrupted system call, delivering the exception to the user program.

10. A method for processing an exception according to claim 1 in which the exception is drawn from a set of exceptions including a privilege fault exception and a floating point arithmetic exception.

11. A method of maintaining a virtual exception mask in a digital computer for emulation, the computer having a memory, an operating system and an OS exception mask maintained by the operating system, and the method comprising the steps of:

initializing a virtual exception mask as a data structure stored in the computer memory;

during execution of an emulation in the computer, intercepting a user program system call;

determining whether the system call would modify the OS exception mask;

if the system call would not modify the OS exception mask, delivering the system call to the operating system; and if the system call would modify the OS exception mask, updating the virtual exception mask in accordance with the intercepted system call.

12. A method according to claim 11 wherein the virtual exception mask includes bits for blocking one or more corresponding synchronous exceptions.

13. A method according to claim 12 wherein the synchronous exceptions include an arithmetic fault and a privilege fault.

14. A method according to claim 11 and further comprising maintaining a status mask as a data structure stored in the computer memory for maintaining an indication of a deferred exception.

15. A digital computer having a memory and including:

a legacy user program stored in the memory and comprising a predetermined series of user program instructions, the legacy user program having been constructed for execution on a predetermined legacy platform other than the said digital computer, an emulator program stored in the memory for executing the user program instructions by interpreting the user program instructions so as to form corresponding new instructions executable in the said digital computer; and a virtual exception mask stored in the memory and maintainable by the emulation program for handling exceptions encountered during execution of the said new instructions so as to simulate exception behavior of the legacy user program on the legacy platform.

16. A digital computer according to claim 15 and further comprising means for determining whether an exception encountered during execution of the said new instructions was caused by the said emulator program or one of the said new instructions.

17. A digital computer according to claim 16 and further comprising means for intercepting an exception encountered during execution of the said new instructions in accordance with the virtual exception mask.

18. A digital computer according to claim 17 wherein the digital computer comprises a VLIW processor architecture and the legacy platform comprises a RISC processor architecture.

19. A digital computer according to claim 15 in which the exception is drawn from a set of exceptions including a privilege fault exception and a floating point arithmetic exception.

* * * * *